United States Patent Office 3,705,214
Patented Dec. 5, 1972

3,705,214
CATALYZED PROCESS FOR PRODUCING PENTA-
VALENT PHOSPHORUS DERIVATIVES
Donald J. Martin, Irvington, N.Y., assignor to Stauffer
Chemical Company, New York, N.Y.
No Drawing. Filed Apr. 15, 1970, Ser. No. 28,939
Int. Cl. C07f 9/28, 9/50
U.S. Cl. 260—969
16 Claims

ABSTRACT OF THE DISCLOSURE

There is disclosed a process for preparing organo pentavalent phosphorus compounds by reacting (a) an aromatic or vinyl halide with (b) a trivalent phosphorus compound having at least one alkoxy substituent on the phosphorus atom, in the presence of a divalent palladium salt catalyst.

BACKGROUND OF THE INVENTION

Various methods are known in the art for the production of pentavalent phosphorus organo compounds wherein each carbon atom to which the phosphorus is directly bonded is a portion of an aliphatic moiety and is not a member of an unsaturated linkage. For example, alkyl halides react with trialkyl phosphites to produce dialkyl phosphonic acid esters in a type of process frequently referred to as the Arbuzov reaction. Such processes have not, until recently, been available for the reaction of aromatic or vinyl halides with phosphites or similar trivalent phosphorus compounds and, as a result, esters of aromatic or vinyl phosphonic acids could be prepared only in multi-step operations, e.g., by reaction of an aromatic hydrocarbon with a halophosphine followed by hydrolysis and esterification.

In the U.S. Pat. No. 3,493,639, to Tavs, which issued on Feb. 3, 1970, assigned to Shell Oil Company, there is disclosed a convenient one-step process for preparing organo pentavalent phosphorus compounds involving the use of nickel halides to catalyze the reaction between an aromatic or vinyl halide and a trivalent phosphorus compound having at least one alkoxy substituent on the phosphorus atom. Although the process disclosed in the latter patent represents a distinct advantage over the prior art processes for preparing compounds of this type, it still leaves room for improvement. Thus, for example, those skilled in the art would be most desirous of being able to reduce the concentration of the catalyst that is required in order to conduct the reaction and/or to improve upon the yields of the pentavalent phosphorus reaction product that are attainable therefrom.

It is an object of the present invention to provide an improved method for producing certain pentavalent phosphorus compounds wherein the phosphorus is directly bonded to an atom which is a member of an aromatic ring or an ethylenic linkage. More particularly, it is an object of the present invention to provide an improved catalyzed process for reacting aromatic or vinyl halides with trivalent phosphorus compounds having at least one alkoxy substituent on the phosphorus atom so as to produce analogous pentavalent phosphorus compounds having as a phosphorus substituent the aromatic or vinyl moiety of the halide reactant. A further object involves preparing the latter pentavalent phosphorus reaction products in high yields and by the use of substantially lower concentrations of catalyst than has heretofore been possible. Various other objects and advantages of this invention will be apparent from a reading of the disclosure which follows hereinafter.

TECHNICAL DISCLOSURE OF THE INVENTION

It has now been found that the above objects are accomplished by contacting and reacting (a) an aromatic or vinyl halide with (b) a trivalent phosphorus compound having at least one alkoxy substituent on the phosphorus atom in the presence of a divalent palladium salt catalyst, preferably under conditions whereby the alkyl halide byproduct of the contacting is continuously removed from the reaction mixture. This process results in the formation of a pentavalent phosphorus product characterized by a phosphorus-oxygen multiple bond and by a direct bond between the phosphorus and the aromatic or vinyl moiety of the halide reactant. Moreover, it has been found, quite surprisingly, that the use of the novel palladium catalysts of this invention results in equivalent or substantially higher yields of the desired reaction products while permitting the use of these catalysts in concentrations which are well below those which have been required with the catalysts of the prior art.

The aromatic or vinyl halide reactants suitable for use in the process of the present invention are reactants containing up to 20 carbon atoms and are representd by the formula:

(I)  $R(X)_m$ wherein X is halogen, $m$ is a whole number of from 1 to 6, and preferably from 1 to 2 inclusive, and R represents an organic radical characterized in that the carbon atom to which each X moiety is attached is a member of an aromatic ring or is a member of an ethylenic linkage, i.e., a member of a carbon-carbon double bond. The R group is hydrocarbon, that is, it contains only atoms of carbon and hydrogen, or is a substituted-hydrocarbon wherein the non-hydrocarbon substituent(s) is(are) non-reactive. It is well known that non-vinylic aliphatic halides are more reactive than halides of either the aromatic or vinyl types and, as a result, it is necessary that the R moiety be free from halogen substituents attached to non-vinylic aliphatic carbon atoms, i.e., it must be free from such aliphatic halide groups. The R moiety suitably contains from 2 to 20 carbon atoms, preferably from 2 to 10, and when it is a substituted-hydrocarbyl, it should contain from 1 to 3 non-reactive substituents such as alkoxy, aryloxy, hydroxy, carboxy, carbalkoxy, nitro, amino, mono- and dialkylamino mercapto, alkylmercapto or acyl.

In the above given Formula I, the X term independently represents halogen and halide reactants wherein the halogen(s) is(are) fluorine, chlorine, bromine or iodine is(are) at least in part operable. Preferred as the X term, however, are the halogens of atomic number from 17 to 35 inclusive, i.e., the middle halogens chlorine and bromine.

The halide reactant preferably contains from 1 to 2 aromatic rings and/or 1 to 2 ethylenic linkages as the only carbon-carbon unsaturation present thereon. Illustrative of suitable halide reactants are the hydrocarbon vinyl halides such as:

vinyl chloride
1-chloropropene
1-bromopropene
2-chlorobutene-2
1-bromododecene
1,8-dichloro-1,7-octadiene
1-chloro-6-bromo-1,5-hexadiene
1-bromocyclohexene
1,2-dichloroethylene
α-chlorostyrene
β-bromostyrene and 1,2-dibromoethylene the hydrocarbon aromatic halides including:

chlorobenzene
bromobenzene
p-bromochlorobenzene
o-dichlorobenzene
m-chlorotoluene
p-chlorostyrene
α-chloronaphthalene
β-bromonaphthylene
4,4'-dibromobiphenyl
2,2-bis(4-chlorophenyl)propane
p-tert-butylchlorobenzene
1-chloro-2,4,6-trimethylbenzene
1-bromo-3,5-dihexylbenzene and
p-tetradecychlorobenzene the substituted-hydrocarbon vinyl halides such as:

4-acetoxy-1-chlorobutene
3-ethoxy-1-chloropropene
6-bromohept-5-en-2-one, and
2-(p-nitrophenyl)-1-bromoethylene and the substituted-hydrocarbon aromatic halides including:

p-carbethoxychlorobenzene
m-bromobenzoic acid
p-chloroaniline
2,4-dibromobenzoic acid
m-nitrobromobenzene
o-bromo-N,N-dimethylaniline
3-bromo-4-chlorothiophenol, and
methylmercaptochlorobenzene Also suitable are heterocyclic halide reactants which may be considered to be either of the aromatic or vinyl type, e.g., 2-chlorothiophene, 3-bromothiophene, 2-chloropyridine, 3,5-dibromopyridine and 3-chlorofuran.

Largely because of the desirability of the products derived therefrom, aromatic halide reactants are preferred over analogous reactants of the vinyl type and particularly preferred are the mono-nuclear carbocyclic aromatic halides which are hydrocarbyl halides or substituted-hydrocarbyl halides wherein the non-hydrocarbyl substituents are hydroxy, amino, mono- to dialkylamino, alkanoyl or carbalkoxy.

The process of the invention comprises the reaction of one of the aromatic or vinyl halide reactants, as defined hereinabove, with a trivalent phosphorus derivative having at least one alkoxy group as a phosphorus substituent. One class of such trivalent phosphorus derivatives is represented by the formula:

(II) 

wherein R' is lower alkyl of up to 7 carbon atoms, with the proviso that two R's may together form a divalent alkylene moiety of from 2 to 7 carbon atoms, R'' is R or R' wherein R and R' are as previously defined, $a$ is a whole number of from 1 to 3 inclusive and $b$ is a whole number of from 0 to 2 inclusive selected so that the sum of $a$ and $b$, i.e., the term $(a+b)$ is equal to 3.

In the above given Formula II, when $a$ is 1, that is when the phosphorus has a single alkoxy substituent, the trivalent phosphorus has a single alkoxy substituent, the trivalent phosphorus reactant is an alkyl phosphinite as illustrated by methyl diethylphosphinite, ethyl dioctylphosphinite, butyl diphenylphosphinite, hexyl phenyloctyl phosphinite, 1 - propoxyphospholidine, 1 - methoxyphospholidine, amyl dimethylphosphite and propyl bis(p-ethoxyphenyl)phosphinite.

When the term "$a$" in the above given Formula II is 2, the trivalent phosphorus reactant is a dialkyl phosphonite as exemplified by diethyl benzenephosphonite, diisopropylethanephosphonite, dihexyl p-aminobenzenephosphonite, dimethyl butanephosphonite, dibutyl heptanephosphonite and dimethyl benzenephosphonite.

When each phosphorus substituent of the trivalent phosphorus reactant is an alkoxy group, the reactants are trialkyl phosphites as illustrated by trimethylphosphite, triethylphosphite, triisopropyl phosphite, methyl diethyl phosphite, tributyl phosphite, ethyl propyl hexyl phosphite, trihexylphosphite and 1-ethoxy-1,3,2-dioxaphosphorinane and 1-methoxy-1,3,2-dioxaphospholidine. The class of trialkyl phosphites, particularly acyclic trialkyl phosphites, comprises a preferred class of trivalent phosphorus reactants.

With respect to proportions, one may utilize a concentration of the halide reactant which can be less than, equal to, or in excess of the concentration of the trivalent phosphorus reactant depending upon the particular halide and phosphorus reactants which are being utilized in the reaction. The optimum ratio of reactants will in part depend upon the functionality of the halide reactant, i.e., upon whether the halide reactant has one or two halogen substituents and, it should be appreciated, that when the halide reactant is a reactant containing two halogen substituents, it is possible to effect reaction of one or alternatively of both halide moieties, particularly when the halogen substituents are not the same. In general, suitable molar ratios of the halide reactant to the trivalent phosphorus reactant of from about 1.0:0.75 to 1:3 are satisfactory.

The palladium salt catalysts suitable for use in carrying out the process of this invention are divalent palladium salts which may be selected from the group consisting of divalent palladium halides, such as palladium chloride and palladium bromide, and divalent palladium alkanoates, i.e., divalent palladium salts of the $C_1$–$C_5$ alkanoic acids such as palladium acetate, palladium propionate, palladium isopropionate, palladium n-butyrate, palladium isobutyrate, palladium t-butyrate, palladium n-pentanoate.

However, from the above group of divalent palladium salt catalysts, optimum results are obtained by the use of palladium chloride and palladium acetate.

The amount of palladium salt catalyst to be employed is not critical and can best be defined as a catalytically effective concentration. Thus, satisfactory results are obtained when concentrations of catalyst from about 0.1 mole percent to about 20 mole percent based on the trivalent phosphorus reactant are employed. Preferred, however, are concentrations of catalyst of from about 1 mole percent to about 5 mole percent on the same basis.

The process of this invention is conducted by contacting the reactants and the selected catalyst at an elevated temperature. Temperatures of from about 100° C. to about 250° C. are satisfactory. When the more reactive aromatic or vinyl bromides are employed, a preferred reaction temperature range is from about 130° C. to about 170° C. The less active aromatic or vinyl chlorides are preferably reacted at a somewhat higher temperature, e.g., from about 150° C. to about 200° C.

The reaction is conducted under conditions whereby the reactants are maintained in the liquid phase. Although on some occasions it may be useful to employ an inert reaction diluent, e.g., an aromatic hydrocarbon, in most instances the presence of a diluent is not required and is preferably avoided. The reaction pressure is not critical so long as the reactants are maintained substantially in the liquid phase. Suitable pressures are atmospheric or superatmospheric, e.g., from about 1 atmosphere to about 50 atmospheres.

To obtain optimum results, the reaction is preferably conducted under substantially anhydrous conditions in an inert reaction environment and the presence, in the reaction mixture, of reactive materials such as water, oxygen and the like is preferably avoided. If desired, a small proportion of a conventional antioxidant, e.g., up to about 2% wt. of hydroquinone; 2,6-ditertbutyl-4-methylphenol; bis(3,5-di-tert-butyl-4-hydroxyphenyl)methane or the like, may be included within the reaction mixture in order to counteract the effect of any oxygen inadvertently introduced into the reaction mixture but, for most applications, the addition of an antioxidant is not of any substantial benefit.

The reaction is conducted by contacting the halide reactant and the trivalent phosphorus reactant in the presence of the catalyst. Although other reaction procedures are operable, it is preferred, in order to obtain maximum yields of product and to minimize undesirable side reactions, to add one reactant, e.g., the trivalent phosphorus compound, either gradually or in increments to a mixture containing all of the other reactants together with at least a portion of the catalyst while removing the alkyl halide by-product from the reaction mixture. In this manner, prolonged contact between the alkyl halide by-product and unreacted trivalent phosphorus reactant is avoided. A variety of methods for removing the alkyl halide are available, e.g., removal through selective extraction or stable complex formation. However, the preferred methods comprise removal of the alkyl halide by-product in the vapor phase as by distilling the alkyl halide from the reaction mixture at a rate substantially equivalent to the rate of addition of the trivalent phosphorus reactant. Subsequent to the completion of the reaction, the product mixture is separated and the product recovered by conventional methods, e.g., as by fractional distillation, filtration, selective extraction, fractional crystallization and the like.

The product of the invention is pentavalent phosphorus compound characterized by a phosphorus-oxygen double bond, by one less alkoxy phosphorus substituent than the trivalent phosphorus reactant and by the presence, as a phosphorus substituent, of the organic moiety of the aromatic or vinyl halide reactant. In terms of the preferred reactants, as above defined, the product is represented by the formula:

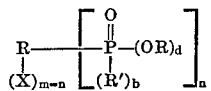

wherein R, R', R", m and b are as defined above, n is a whole number of from 1 to 2 selected so that $m+n=2$, and d is a whole number of from 0 to 2 inclusive selected so that $b+d=2$.

Illustrative of such products are dialkyl phosphonic acid esters produced from trialkyl phosphites, e.g., diethyl phenylphosphonate, diethyl p-tolylphosphonate, dimethyl p-dodecylphenylphosphonate, diethyl α-styrylphosphonic acid and dipropyl vinylphosphonate; alkyl phosphinic acid esters prepared from dialkyl phosphonites, such as ethyl phenyl (p-methoxyphenyl)phosphinate, ethyl diphenylphosphinate and propyl di(α-naphthyl)phosphinate; and tertiary phosphine oxides prepared from alkyl phosphinites, e.g., triphenylphosphine oxide, diphenyl(p-dodecylphenyl)phosphine oxide and vinyldiethylphosphine oxide.

These pentavalent phosphorus compounds are useful as agricultural chemicals, particularly as insecticides, as oxidation-inhibiting additives for mineral lubricating oils, and as selective extraction solvents as for selectively separating aromatics from paraffins, e.g., benzene from a $C_6$ paraffin fraction of similar boiling point. The vinyl pentavalent phosphorus derivatives are particularly useful as monomers to be incorporated into polyolefins, such as polyethylene or polypropylene, in order to provide flame resistance to the resulting polymer compositions.

The following examples will further illustrate the embodiments of this invention.

EXAMPLE I

This example illustrates the preparation of diethyl phenylphosphonate by means of the process of this invention which, in this case, involves the use of palladium chloride as the catalyst for the reaction.

Into a reaction vessel fitted with means for distillation, there is introduced bromobenzene (31.4 g., 0.2 mole) and palladium chloride (1.0 g., 0.0056 mole). The resulting mixture is heated to 155° C. thereby initiating reflux whereupon triethyl phosphite (36.6 g., 0.22 mole) is added, dropwise, to the reaction vessel over a 2 hour period. Subsequent to the introduction of the latter reagent, the temperature of the system is maintained at 155° C. for an additional hour. Throughout the course of the reaction, the ethyl bromide by-product is distilled from the system. Next, the contents of the vessel are cooled down to room temperature yielding 44.5 g. of a reaction product which, on being subjected to gas-liquid chromatographic analysis, reveals a purity of 87%, comprising a yield of 90% of the desired diethyl phenylphosphonate. The latter yield is thus seen to be equivalent to the yield of this product which was reported in Example I of the Tavs patent despite the fact that the latter patentee required the use of a substantially higher concentration of his nickel chloride catalyst, i.e., 6.5 g./mole bromobenzene or 0.01 mole $N_1Cl_2$/0.2 mole bromobenzene.

The above described reaction procedure of this example is repeated substituting trimethyl phosphite and tributyl phosphite, respectively, for the triethyl phosphite, thereby yielding dimethyl phenyl phosphonate and dibutyl phenyl phosphonate, all of which are produced in yield comparable to that attained for the diethyl phenylphosphonate. In still another series of repetitions of the above described reaction procedure of this example, m-chlorotoluene, p-chlorobromobenzene and p-carbethoxybromobenzene are each, in turn, substituted for the bromobenzene, thereby yielding diethyl-m-tolyl phosphonate, diethyl p-chlorophenyl phosphonate and diethyl p-carbethoxyphenyl phosphonate all of which are produced in yields comparable to that attained for the diethyl phenylphosphonate.

EXAMPLE II

This example illustrates the preparation of diethyl phenylphosphonate by means of the process of this invention which, in this case, involves the use of palladium acetate as the catalyst for the reaction.

Into a reaction vessel fitted with means for distillation, there is introduced bromobenzene (31.4 g., 0.2 mole) and palladium acetate (1.0 g., 0.0041 mole). The resulting mixture is heated to 155°C., thereby initiating reflux whereupon triethyl phosphite (36.6 g., 0.22 mole) is added, dropwise, over a 2 hour period. Subsequent to the introduction of the latter reagent, the temperature of the system is maintained at 155° C. for an additional hour. Throughout the course of the reaction, the ethyl bromide by-product is distilled from the system. Next, the contents of the vessel are cooled down to room temperature yielding 54 g. of a reaction product which is collected on a Dry Ice-acetone trap and which, on being subjected to gas-liquid chromatographic analysis, reveals a yield of 80% of the desired diethyl phenylphosphonate.

EXAMPLE III

This example illustrates the preparation of a mixture of diethyl meta-bromophenyl phosphonate and tetraethyl meta-phenylenediphosphonate by means of the process of this invention.

A mixture of meta-dibromobenzene (23.5 g., 0.1 mole) and palladium chloride (0.885 g., 0.005 mole) is maintained at a temperature of from 150–170° C., for a period of 3 hours while triethyl phosphite (33.2 g., 0.2 mole) is added dropwise. The resulting mixture is then maintained at the latter temperature level for an additional 1–2 hours. Throughout the course of the reaction, the ethyl bromide byproduct is distilled from the system. Next, the contents of the vessel are cooled down to room temperature yielding ~40 g. of a reaction product which, on being subjected to distillation and gas-liquid chromatographic analysis, reveals a yield of 14% of diethyl metabromophenyl phosphonate and 20% of tetraethyl meta-phenylenediphosphonate.

The above described reaction product of this example is repeated substituting (1) trimethyl phosphite and (2) triisopropyl phosphite, respectively, for the triethyl phophite thereby yielding: (1) a mixture of dimethyl metabromophenyl phosphonate and tetramethylmetaphenylene diphosphonate; and (2) diisopropyl metabromophenyl phosphonate and tetraisopropyl metaphenylene diphosphonate, all of which are produced in yields comparable to that attained for the diethyl phenylphosphonate.

EXAMPLE IV

This example illustrates the preparation of diethyl vinylphosphonate by means of the process of this invention.

A solution of palladium chloride (1.0 g., .0056 mole), and triethyl phosphite (42 g., 0.25 mole) is introduced dropwise over a 1½ hour period to an autoclave containing a solution of vinyl chloride (31.2 g., 0.5 mole) in 150 ml. benzene (containing 0.62 g. hydroquinone) and which is being maintained at 180° C. and ~500 p.s.i. After it is rocked overnight, the autoclave is vented and the resulting solution is filtered and stripped affording 43 g. of diethyl vinyl phosphonate. Gas-liquid chromatography reveals a purty of 89% and a yield of 92%. Upon distillation, a colorless liquid, B.P. 78–79° C./10 mm., $n_D^{26}$ 1.4285 (reported B.P. 62° C./3 mm., $n_D^{20}$ 1.4300) is obtained. Infra-red and nuclear magnetic resonance spectroscopy confirms the structural assignment. The latter yield is thus seen to be equivalent to that reported in Example V of the Tavs patent for this same reaction product despite the fact that the latter patentee requires the use of a substantially higher concentration of catalyst, i.e. 0.14 mole, 0.14 mole/2.0 moles TEP.

The above described reaction procedure is repeated substituting trimethyl phosphite, triisopropyl phosphite and tributyl phosphite, respectively, for the triethyl phosphite, thereby yielding dimethyl vinyl phosphonate, diisopropyl vinyl phosphonate and dibutyl vinyl phosphonate, all of which are produced in yields comparable to that attained for the diethyl vinylphosphonate. In still another series of repetitions of the above procedure, 1,2-dibromoethylene and 1-bromopropene are each, in turn, substituted for the vinyl chloride thereby yielding tetraethyl ethylene-1,2-diphosphonate and diethyl propenyl phosphonate, respectively, each of which are produced in yields comparable to that attained for the diethyl vinylphosphonate.

Variations may be made in proportions, procedures and materials without departing from the scope of this invention as defined in the following claims.

What is claimed is:

1. In the process of producing organo pentavalent phosphorus compounds by intimately contacting and reacting (a) an aromatic or vinyl halide reactant of the formula:

$$R(X)_m$$

wherein X is halogen of atomic number from 17 to 35 inclusive, $m$ is a whole number from 1 to 6 inclusive and R is an organic radical free from non-vinylic aliphatic halide group of up to 10 carbon atoms selected from (i) a hydrocarbyl aromatic radical bonded to each X by a bond from a carbon atom which is a member of an aromatic ring, (ii) a mono-substituted hydrocarbyl aromatic radical bonded to each X by a bond from a carbon atom which is a member of an aromatic ring and the substituent is selected from the group consisting of alkoxy, dialkylamino, alkanoyl, carbalkoxy and acetoxy radicals and (iii) a hydrocarbyl vinyl radical bonded to each X by a bond from a carbon atom which is a member of a carbon-carbon double bond, and (b) a trivalent phosphorus reactant having at least one alkoxy phosphorus substituent of the formula:

wherein R' is alkyl group of up to 7 carbon atoms with the proviso that two R' groups may together form a divalent radical of from 2 to 7 carbon atoms, R" is R or R', $a$ is a whole number of from 1 to 3 inclusive and $b$ is a whole number of from 0 to 2 inclusive selected so that $a+b=3$; the improvement which comprises conducting said reaction in the presence of a catalytically effective amount of a divalent palladium salt selected from the group consisting of a palladium halide and a palladium $C_1$–$C_5$ alkanoate.

2. The process of claim 1, wherein said palladium halide is palladium chloride.

3. The process of claim 1, wherein said palladium alkanoate is palladium acetate.

4. The process of claim 1, wherein R is a mononuclear aromatic radical.

5. The process of claim 4, wherein said trivalent phosphorus reactant is a trialkyl phosphite.

6. The process of claim 5, wherein said trialkyl phosphite is triethyl phosphite.

7. The process of claim 5, wherein R is a phenyl or phenylene radical.

8. The process of claim 1, wherein R in said vinyl halide reactant is a hydrocarbyl vinyl radical bonded to each X by a bond from a carbon atom which is a member of a carbon-carbon double bond.

9. The process of claim 8, wherein said trivalent phosphorus reactant is a trialkyl phosphite.

10. The process of claim 8, wherein R is a vinyl radical.

11. The process of claim 8, wherein said vinyl halide reactant is vinyl chloride.

12. The process of claim 9, wherein said trialkyl phosphite is triethyl phosphite.

13. The process of claim 1, wherein said process is conducted in an inert environment.

14. The process of claim 1, wherein the alkyl halide by-product of the reaction is continuously removed as it is formed.

15. The process of claim 1, wherein said process is conducted at a temperature in the range of from about 100 to 250° C.

16. The process of claim 1, wherein $m$ in the formula for said aromatic or vinyl halide reactant is a whole number from 1 to 2 inclusive.

References Cited

UNITED STATES PATENTS 2,956,952 10/1960 FitzGerald et al. --- 260—969 X
3,493,639 2/1970 Tavs -------------- 260—969

LEWIS GOTTS, Primary Examiner

A. H. SUTTO, Assistant Examiner

U.S. Cl. X.R.

252—472; 260—290 HL, 329 P, 346.1, 488 H, 593 H, 609 R, 614 R, 606.5 P, 646, 648 R, 651 R, 654 R, 937, 956, 961, 962

UNITED STATES PATENT OFFICE
CERTIFICATE OF CORRECTION

Patent No. 3,705,214      Dated Dec. 5, 1972

Inventor(s) Donald J. Martin

It is certified that error appears in the above-identified patent and that said Letters Patent are hereby corrected as shown below:

Column 1, line 54, the word "whrein" should read -- wherein --.

Column 2, line 22, the word "representd" should read -- represented --.

Column 7, line 3, the word "product" should read -- procedure --.

Signed and sealed this 20th day of November 1973.

(SEAL)
Attest:

EDWARD M. FLETCHER, JR.      RENE D. TEGTMEYER
Attesting Officer      Acting Commissioner of Patents